May 17, 1932. C. O. BEDFORD 1,859,018
COUPLING
Filed June 23, 1928
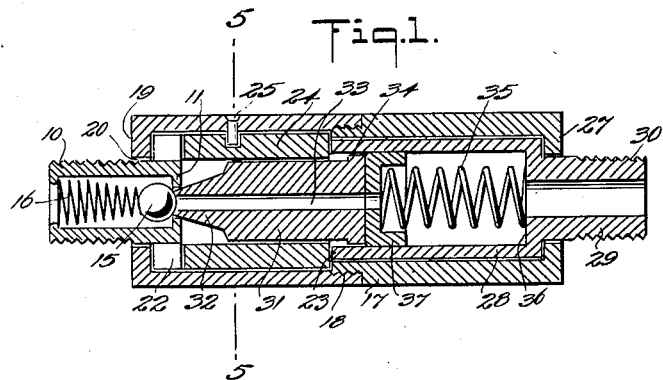
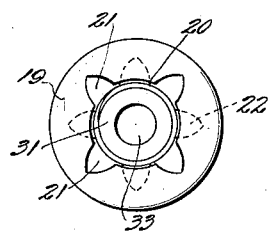
Fig.2.
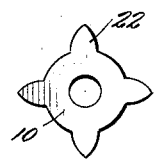
Fig.3.
Fig.4.
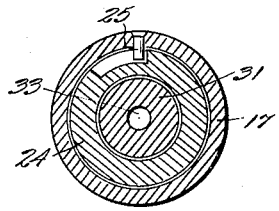
Fig.5.
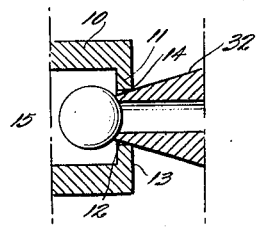
Fig.6.
INVENTOR
CLAYTON O. BEDFORD
BY
Warren S. Orton
ATTORNEY Patented May 17, 1932

1,859,018

UNITED STATES PATENT OFFICE

CLAYTON O. BEDFORD, OF NEW YORK, N. Y.

COUPLING

Application filed June 23, 1928. Serial No. 287,879.

The invention relates in general to a readily detachable coupling of the type which is commonly used for connecting high pressure grease guns in a hermetically tight engagement with projecting nipples on machine parts so that lubricant may be forced under high pressure to lubricate the machine parts.

More specifically defined the invention relates to that form of couplings in which the pressure of the grease or other fluid passing therethrough is utilized to provide a fluid tight engagement with the fitting carried by the machine parts.

The primary object of the invention is to provide a simplified form of coupling which can be easily and quickly installed in position in accurately located relation to the fitting and which when the fluid is forced therethrough will maintain itself in a knife edge engagement with the fitting so as to utilize the fluid pressure to effect a highly intensified sealing engagement at said knife edge contact.

Still another object of the invention is to provide a readily mountable and demountable form of connection between the coupling and the fitting; which connection will be rugged and less liable to breakage than the usual pin fitting, which will be guided automatically into and positively held in operative engagement with the fitting and in which the separable parts are quickly kicked apart when the coupling is turned into releasable position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Fig. 1 is a view in axial section through a coupling constituting a preferred embodiment of the invention and shown in operative engagement with a conventional form of fitting;

Figs. 2 and 3 are end views respectively of the coupling and fitting;

Fig. 4 is an end view of the positioning collar shown in axial section in the coupling of Fig. 1;

Fig. 5 is a transverse sectional view taken on the line 5—5 of Fig. 1; and

Fig. 6 is an enlarged detail view showing the engagement of the nozzle with the fitting enlarged from the similar showing of these parts in Fig. 1.

In the drawings and referring first to Fig. 1 there is shown a conventional form of fitting 10 designed to be screwed into the machine part intended to be lubricated. The outer end of the fitting is provided with an inturned flange 11 provided centrally thereof with cylindrical intake port 12. The wall outlining the port 12 coacts with the end wall 13 of the fitting to provide a sharp circular edge 14 providing a coupling nozzle seat. The intake port 12 is normally closed by a spherical valve 15 maintained in seated position by a spring 16 housed within the fitting.

Referring to the coupling there is disclosed a two part shell 17 with adjacent ends in threaded engagement as shown at 18. This construction permits of a ready mounting of the parts within the shell and the securing of the contained parts in position. The end wall 19 of this shell, which is designed to telescope the adjacent end of the fitting 10, is provided centrally thereof with an opening 20 and extending radially from this opening is a plurality, in this case shown to be four, of circumferentially spaced supplemental recesses 21 designed to receive the correspondingly spaced ears 22 projecting radially from the end of the fitting 10 as shown in end view in Fig. 3 and in side elevation in Fig. 1.

Fitted within the shell 17 and positioned between the ears 22 of the fitting and a shoulder 23 formed on the shell 17 is a positioning collar 24 mounted to have a limited rotary movement in the shell and restrained in its degree of rotation by means of a pin and slot connection 25 disposed between the shell 17 and the collar as particularly shown in Fig. 5. The end of the collar facing the fitting is provided with four circumferentially spaced recesses 26 adapted to receive the ears 22 as the coupling is fitted over the pin fitting 10 and rotated thereon to bring the ears 22 into engagement with the locating slots 26.

Rotatably mounted in the shell 17 and fitting therein between the collar 24 and the end 27 of the shell 17 is a barrel 28, a reduced end 29 of which projects exteriorly of the shell 17 and is provided with threads 30 designed to engage the pump, gun or other tubular part extending from the source of fluid supply. From this construction, it is apparent that the shell 17 is free to rotate about the barrel 28 and that there is thus provided a swivel connection between the relatively fixed source of fluid supply and the coupling designed to facilitate the rotation of the coupling in its engagement with the fitting 10.

Slidably mounted for axial movement in the cylinder provided by the collar 24 and barrel 28 is a nozzle 31. The nozzle is provided at one end with a conical nose 32 designed to intrude into the intake port 12 and have its outer face in engagement with the sharp circular edge 14 as particularly noted in Fig. 6. The inclination of the nozzle is such that its end intrudes into the opening 12 a distance just sufficient to displace the valve 15 from its position normally closing this inlet. From this construction, it will be understood that as soon as the coupling is disposed in position as shown in Figs. 1 and 6 it automatically displaces the valve 15 from its position closing the intake port and then permits the valve 15 to close the passageway 33 extending axially through the nozzle. Except for the closing of the passageway 33 by the fitting valve 15, this passageway is otherwise open to the source of liquid supplied through the barrel 28.

It is a feature of this disclosure that the rear end of the nozzle opposite its forward or conical nose is of relatively large area exposed to the pressure in the barrel 28. This area is materially greater than the area outlined by the circle defining the edge 14. This means that the liquid pressure acting over the relatively large area at the rear of the nozzle provides an extremely intensified engagement between the nozzle and fitting along the sharp edge 14 and thus tends effectively to resist any tendency of leakage past this edge. In this way possibility of leakage between the coupling and fitting has been reduced to a minimum.

In order to maintain the nozzle normally in projected position with a rear shoulder 34 engaging the rear end of the collar 24 a spring 35 is positioned in the barrel 28 with one end engaging the nozzle and the opposite end engaging a shoulder 36 formed in the barrel 28.

In order to prevent any possibility of leakage past the rear end of the nozzle, a cup gasket 37 is positioned at the rear end of the nozzle and snugly fitting in the barrel 28. This gasket may also be used as a seat for receiving one end of the spring 35 and assists in maintaining the spring in its normal position centered in the barrel.

In operation, it is understood that the end 19 of the coupling is inserted over the fitting in such way that the radially extending fingers 22 pass into the recesses 21 and a partial rotation of the shell 17 permits the fingers 22 to engage in the recesses 26 as shown in dotted outline in Fig. 2. As the coupling is fitted over the fitting the spring projected nozzle will engage in the intake port 12 and incidentally unseat the valve 15 as previously outlined.

By means forming no part of the present disclosure, the grease or other fluid is admitted under pressure through the barrel 28 and through the open passageway 33 in the projected nozzle. The incoming fluid will, of course, displace the valve 15 from the end of the nozzle permitting the fluid to pass through the fitting to the machine parts to be lubricated. At the termination of the operation the coupling is rotated in either direction until the fingers 22 face the slots 21 at which time the spring 35 acting on the plunger causes the plunger to kick the coupling away from the fitting. When the fitting valve is free of the nozzle the spring 16 reacts on the valve 15 to reseat the same and thus automatically close the fitting.

I claim:

1. In a device of the class described, the combination of a fitting provided with a cylindrical intake port, the wall outlining the port coacting with the wall defining the outer face of the fitting to form a sharp circular edge providing an exposed seat for receiving a coupling nozzle, a spring pressed valve within the fitting normally closing said port, a coupling adapted to be demountably secured to the fitting, said coupling including a shell, a nozzle slidably mounted in the shell and provided at one end with a conical nose adapted to be intruded into the intake port to move the valve into open position and engaging said sharp circular edge to provide a circular line contact therewith having a relatively small radius and outlining a relatively small area and its outer end defining its maximum diameter and providing a pressure receiving surface of relatively large area, a spring within the shell bearing on the nozzle at its opposite end and tending normally to force the nozzle in a direction towards the fitting and into position to open the valve in the fitting, means for admitting fluid under pressure to said large area end of the shell opposite the end engaging the fitting, said opposite end of the nozzle exposed to the pressure admitted to the shell through said means and having an area acted upon by said pressure equal to the maximum cross sectional area of the nozzle.

2. In a device of the class described, the combination of a fitting provided with a cylindrical intake port, the wall outlining the port coacting with the wall defining the outer face of the fitting to form a sharp circular edge providing an exposed seat for receiving a coupling nozzle, a valve for closing the intake port, a spring acting on the valve and tending normally to maintain the valve in port closing position engaging said wall defining the outer face of the fitting, a coupling adapted to be demountably secured to the fitting, said coupling including a shell, a nozzle slidably mounted in the shell and provided at one end with a conical nose adapted to be intruded into the intake port to displace the valve against the resistance of its spring into position to open the port and engaging said sharp circular edge to provide a circular line contact therewith having a relatively small radius and outlining a relatively small area, means for admitting fluid under pressure to the end of the shell opposite the end engaging the fitting, said opposite end of the nozzle exposed to the pressure admitted to the shell through said means and having an area acted upon by said pressure greater than the area outlined by said line of contact between the nozzle and fitting and approximately equal to the maximum cross sectional area of the nozzle.

3. In a device of the class described, the combination of a fitting provided with a cylindrical intake port, a spring pressed valve normally closing said port, the wall outlining the port coacting with the wall defining the outer face of the fitting to form a sharp circular edge providing an exposed seat for receiving a coupling nozzle, a coupling adapted to be demountably secured to the fitting, said coupling including a shell, a cylindrical floating plunger constituting a nozzle slidably mounted in the shell and provided at one end with a conical nose adapted to be intruded into the intake port to move the valve into position to open the port and engaging said sharp circular edge to provide a circular line contact therewith having a relatively small radius and outlining a relatively small area and a stop flange defining the opposite end of the nozzle and extending laterally beyond the outlining wall thereof, said nozzle normally closed by the valve in the fitting, means for admitting fluid under pressure to the flange end of the shell and acting thereon over the relatively extensive area of said flange.

4. In a device of the class described, the combination of a fitting provided with an intake port, a spring pressed valve normally closing said port, a coupling adapted to be secured to the fitting, said coupling including a shell, a nozzle slidably mounted in the shell and provided at one end with a conical nose adapted to be intruded into said port and engaging the wall outlining the same along a circular line of contact outlining a relatively small area, said nozzle closed by the valve in the fitting when the coupling is secured thereto, means for admitting fluid under pressure to the shell in rear of said nozzle, said nozzle provided with a bore extending axially therethrough and at all times open to the fluid pressure admitted through said means, the end of the nozzle facing said means presenting a surface to the fluid pressure admitted through said means, having an area equal to the maximum cross sectional area of the nozzle.

5. A coupling including a shell, a barrel rotatably mounted in the shell and provided at one end with means for admitting thereto fluid under pressure, a positioning sleeve mounted in the shell in alignment with the barrel, a nozzle slidably mounted in the barrel and sleeve and provided with a bore extending axially therethrough and open at all times to the pressure admitted through said means, the end of the nozzle exposed to said means being of relatively large area, the opposite end of the nozzle defined by a conical nose adapted to engage with a coacting member over a relatively small area whereby the nozzle may be forcefully held in engagement with the coacting member by the pressure of the fluid passed through the coupling and a spring pressed cup gasket slidably mounted in the barrel acting on the large area end of the nozzle and tending formally to project the nose in the same direction in which it is forced by the pressure of the fluid passing through the coupling.

6. A coupling including a shell, a barrel rotatably mounted in said shell and providing means for introducing fluid under pressure to the coupling while permitting a limited relative rotary movement between the barrel and shell, a nozzle having one end slidably mounted in the barrel and exposed to the pressure in the barrel, a spring contained in the barrel, bearing on the nozzle and tending to project the nozzle away from the barrel and means for limiting the movement of the nozzle under the force of said spring.

7. A coupling including a cylindrical shell, a barrel rotatably mounted in the shell at one end thereof fixed against relative axial movement projecting therefrom at said end and constituting a means for introducing fluid under pressure to the coupling, a collar in the shell constituting a continuation of the barrel, means between the collar and the shell limiting the relative rotary movement between the collar and shell, a nozzle slidably mounted in the barrel and collar, a gasket between the barrel and the adjacent end of the nozzle, the opposite end of the nozzle defined by a conical nose adapted to engage a fitting and the adjacent end of the sleeve provided with means for receiving a part of said fitting.

8. A coupling including a cylindrical shell, a barrel rotatably mounted in the shell at one end thereof projecting therefrom at said end and constituting a means for introducing fluid under pressure to the coupling, a collar in the shell constituting a continuation of the barrel, a pin and slot connection between the collar and the shell limiting the relative rotary movement in the barrel and collar, a gasket between the barrel and the adjacent end of the nozzle, the opposite end of the nozzle defined by a conical nose adapted to engage a fitting and the adjacent end of the sleeve provided with means for receiving a part of said fitting, and a compression spring fitted between the gasket and the barrel tending to project the nozzle towards the fitting with which it is intended to engage.

9. A coupling including a cylindrical shell, a barrel having a freedom of rotary movement in the shell, fixed therein against relative axial movement and provided with an inlet constituting a means for introducing fluid under pressure to the coupling, a collar mounted for rotary movement in the shell, disposed in prolongation of the barrel, and coacting therewith to provide a stop shoulder, means between the collar and shell providing for a limited relative rotary movement, a nozzle having a bore extending axially therethrough and open at all times to the pressure admitted through said fluid introducing means, said nozzle provided at one end with an outstanding flange adapted to engage said shoulder and limited thereby in its projected direction, said flange end providing a pressure engaging surface of relatively large area, a gasket slidably mounted in the barrel and engaging the flange end of the nozzle, the opposite end of the nozzle defined by a conical nose adapted to engage a fitting and the adjacent end of the sleeve provided with means for receiving a part of the fitting, and a spring bearing on the gasket to force the same into engagement with the nozzle and acting therethrough with a tendency to project the nose in the same direction in which it is forced by the pressure of the fluid passing through the coupling.

10. A coupling including a cylindrical shell, a barrel mounted for free rotary movement in the shell, fixed against relative axial movement and provided with an inlet for admitting fluid under pressure to the coupling, a cylindrical nozzle slidably mounted in the shell and provided with a bore extending axially therethrough and open in all positions of the nozzle to the pressure admitted through the inlet, the end of the nozzle exposed to said pressure being substantially equal to the maximum cross sectional area of the nozzle, the opposite end of the nozzle defined by a conical nose adapted to engage with a coacting member over a relatively small area whereby the nozzle may be forcefully held in engagement with the coacting member primarily by the pressure of the fluid passed through the coupling and a spring acting between said barrel and exposed end of the nozzle and tending normally to project the nose in the same direction in which it is forced by the pressure of the fluid.

11. A coupling comprising a shell provided with an end wall having a nozzle receiving aperture and supplemental recesses opening into said aperture, a sleeve mounted in the shell for a limited rotary movement and provided at the end adjacent said end wall with recesses adapted to face said supplemental recesses to receive ears projecting laterally from a fitting when the same is intruded into the shell through said aperture in the end wall, a nozzle slidably mounted in the sleeve and having a conical nose adapted to engage said fitting, means acting between the sleeve and nozzle to project the same into engagement with the fitting and for holding the sleeve wall into engagement with ears of the intruded fitting when the shell has been rotated to displace the ears and the sleeve recesses into position offset from the supplemental recesses.

Signed at New York, in the county of New York, and State of New York, this 13th day of June, A. D. 1928.

CLAYTON O. BEDFORD.